(12) United States Patent
Hardy

(10) Patent No.: US 8,527,198 B2
(45) Date of Patent: Sep. 3, 2013

(54) PREDICTIVE TRAFFIC WARNING AND SUGGESTIVE REROUTING SYSTEM AND METHOD

(75) Inventor: Rody Hardy, Portland, OR (US)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 13/091,300

(22) Filed: Apr. 21, 2011

(65) Prior Publication Data

US 2012/0166076 A1    Jun. 28, 2012

Related U.S. Application Data

(60) Provisional application No. 61/426,799, filed on Dec. 23, 2010.

(51) Int. Cl.
*G01C 21/34*    (2006.01)

(52) U.S. Cl.
USPC .......................... 701/414; 701/410; 701/409

(58) Field of Classification Search
USPC ................................ 701/201, 414, 410, 409
See application file for complete search history.

(56) References Cited

U.S. PATENT DOCUMENTS

| | | | |
|---|---|---|---|
| 5,369,588 A | 11/1994 | Hayami et al. | |
| 6,067,501 A * | 5/2000 | Vieweg | 701/423 |
| 6,266,608 B1 | 7/2001 | Pertz | |
| 6,434,477 B1 | 8/2002 | Goss et al. | |
| 6,587,785 B2 | 7/2003 | Jijina et al. | |
| 6,590,507 B2 | 7/2003 | Burns | |
| 6,591,188 B1 | 7/2003 | Ohler | |
| 6,732,049 B2 | 5/2004 | Sato et al. | |
| 6,961,658 B2 | 11/2005 | Ohler | |
| 6,973,384 B2 | 12/2005 | Zhao et al. | |
| 7,092,818 B2 | 8/2006 | Ohler | |
| 7,174,154 B2 * | 2/2007 | Ehlers | 455/404.2 |
| 7,197,320 B2 * | 3/2007 | Joseph | 455/456.1 |
| 7,233,861 B2 | 6/2007 | Van Buer et al. | |
| 7,493,208 B1 * | 2/2009 | Craine | 701/117 |
| 7,698,055 B2 * | 4/2010 | Horvitz et al. | 701/117 |
| 7,849,031 B2 * | 12/2010 | Stehle et al. | 706/21 |
| 7,873,471 B2 * | 1/2011 | Gieseke | 701/416 |
| 8,019,531 B2 * | 9/2011 | Pinkus et al. | 701/416 |
| 2005/0256639 A1 | 11/2005 | Aleksic et al. | |
| 2006/0106530 A1 | 5/2006 | Horvitz et al. | |
| 2006/0129313 A1 | 6/2006 | Becker et al. | |
| 2007/0038360 A1 * | 2/2007 | Sakhpara | 701/117 |
| 2007/0073477 A1 | 3/2007 | Krumm et al. | |
| 2007/0138347 A1 * | 6/2007 | Ehlers | 246/1 R |
| 2007/0276596 A1 * | 11/2007 | Solomon et al. | 701/211 |
| 2007/0293958 A1 | 12/2007 | Stehle et al. | |
| 2008/0294331 A1 | 11/2008 | Fushiki et al. | |
| 2009/0204320 A1 | 8/2009 | Shaffer et al. | |
| 2010/0151838 A1 * | 6/2010 | Wormald et al. | 455/414.1 |

FOREIGN PATENT DOCUMENTS

| | | |
|---|---|---|
| EP | 1657693 | 5/2006 |
| JP | 2006146889 | 6/2006 |

* cited by examiner

*Primary Examiner* — Mary Cheung
*Assistant Examiner* — Michael Berns
(74) *Attorney, Agent, or Firm* — Plumsea Law Group, LLC (57) ABSTRACT

A method and system for providing a traffic warning for a predictive route and a suggestive rerouting for a motor vehicle is disclosed. The method includes steps of retrieving traffic information for roadways included in a predictive travel zone, including traffic incidents. The method also includes steps of calculating a suggestive reroute that reroutes the user around a traffic incident and continuing on a roadway within the predictive travel zone.

20 Claims, 9 Drawing Sheets

PREDICTIVE TRAFFIC WARNING AND SUGGESTIVE REROUTING SYSTEM AND METHOD

BACKGROUND

The present invention relates generally to a motor vehicle, and in particular to a system and method for providing predictive traffic warnings and suggestive rerouting to a motor vehicle.

Navigation systems in motor vehicles typically can calculate an initial route of travel between a starting location and a destination. Navigation systems may make use of various kinds of information to present relevant warnings and travel delays for a route. Some systems use real-time traffic information to provide warnings about traffic along the route. Traffic information can be presented to the user in a list form or as icons on a map display. Current traffic warning systems require substantial interaction by a user to present relevant warnings and to calculate rerouting around traffic along a planned route.

Accordingly, there is a need in the art for a traffic warning system and method that provides relevant traffic warnings and rerouting information.

SUMMARY

In one aspect, the invention provides a method of providing navigation information for a motor vehicle, comprising the steps of: retrieving navigation information associated with a current location and a heading of the motor vehicle; determining a predictive travel zone associated with a predetermined shape around the current location of the motor vehicle and extending in a direction associated with the heading of the motor vehicle; retrieving traffic information corresponding to the predictive travel zone, the traffic information including one or more traffic incidents associated with at least one of a primary roadway and a secondary roadway within the predictive travel zone, the primary roadway being associated with the current location of the motor vehicle and the secondary roadway intersecting the primary roadway and being associated with the heading of the motor vehicle; providing an alert to a user of the motor vehicle if a traffic incident is located within the predictive travel zone; providing an option to the user to reroute the motor vehicle around the traffic incident; receiving a selection from the user to reroute the motor vehicle around the traffic incident; and calculating a new route around the traffic incident and continuing on the secondary roadway, if the traffic incident is associated with the secondary roadway.

In another aspect, the invention provides a method of providing a suggestive reroute around a traffic incident for a motor vehicle, comprising the steps of: calculating a predictive travel zone associated with a predetermined shape around a current location of the motor vehicle and extending in a direction associated with a heading of the motor vehicle; retrieving navigation information corresponding to one or more roadways included in the predictive travel zone; determining a predictive route using the retrieved navigation information, the predictive route being associated with a potential future location of the motor vehicle; identifying a primary roadway along the predictive route, the primary roadway being associated with the current location of the motor vehicle and on which the motor vehicle is traveling; identifying at least one secondary roadway along the predictive route, the at least one secondary roadway intersecting the primary roadway and being associated with the heading of the motor vehicle; retrieving traffic information corresponding to the predictive travel zone, the traffic information including one or more traffic incidents associated with one or more of the primary roadway and the at least one secondary roadway; providing an alert to a user of the motor vehicle if a traffic incident is located within the predictive travel zone; receiving a request from the user to reroute the motor vehicle around the traffic incident; calculating a reroute around the traffic incident and continuing back on the primary roadway, if the traffic incident is associated with the primary roadway; and calculating a reroute around the traffic incident and continuing on the secondary roadway, if the traffic incident is associated with the secondary roadway.

In another aspect, the invention provides a method of providing a suggestive reroute around a traffic incident for a motor vehicle, comprising the steps of: receiving motor vehicle information from at least one sensor associated with the motor vehicle, the motor vehicle information including at least a current location and a heading of the motor vehicle; determining a predictive travel zone associated with a predetermined shape around the current location of the motor vehicle and extending in a direction associated with the heading of the motor vehicle; retrieving navigation information corresponding to one or more roadways included in the predictive travel zone; retrieving traffic information corresponding to the predictive travel zone, the traffic information including one or more traffic incidents associated with at least one of a primary roadway and a secondary roadway within the predictive travel zone, the primary roadway being associated with the current location of the motor vehicle and the secondary roadway intersecting the primary roadway and being associated with the heading of the motor vehicle; providing an alert to a user of the motor vehicle if a traffic incident is located within the predictive travel zone; receiving a request from the user to reroute the motor vehicle around the traffic incident; determining if the traffic incident is associated with the primary roadway or the secondary roadway; and calculating a reroute around the traffic incident and continuing on the secondary roadway, if the traffic incident is associated with the secondary roadway.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
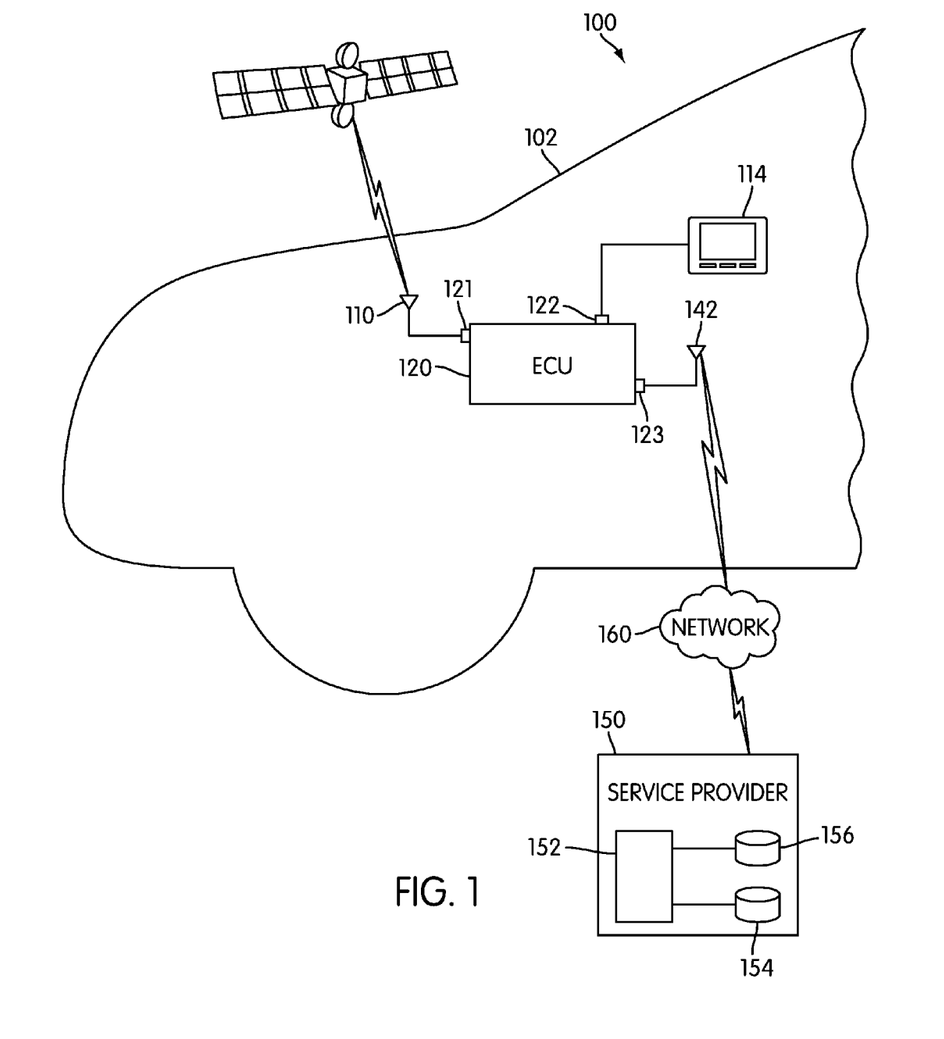
FIG. 1 is a schematic view of an exemplary embodiment of a navigation system associated with a motor vehicle.

FIG. 1 is a schematic view of an exemplary embodiment of navigation system 100 that is configured to be used with motor vehicle 102. For purposes of clarity, only some components of a motor vehicle that may be relevant to navigation system 100 are illustrated. Furthermore, in other embodiments, additional components may be added or removed.

Navigation system 100 may be any system capable of providing navigation information to a user. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information may also include commercial information including business and restaurant names, commercial districts, shopping centers, and parking facilities. Navigation information may also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information may include one item of information, as well as a combination of several items of information.

Generally, any navigation system known in the art may be used. One example of a navigation system is disclosed in U.S. Patent Application Publication Number 2005/0261827, to Furukawa, and filed on May 19, 2004, the entirety of which is hereby incorporated by reference. Another example of a navigation system is disclosed in U.S. Pat. No. 5,842,146, to Shishido, and filed on May 10, 1996, the entirety of which is hereby incorporated by reference.

In some embodiments, navigation system 100 may include provisions for receiving GPS information. In some cases, navigation system 100 may include GPS receiver 110. For purposes of clarity, GPS receiver 110 is illustrated in the form of a GPS antenna in the current embodiment. However, it will be understood that GPS receiver 110 may be associated with both an antenna and a separate receiving device in some embodiments. In an exemplary embodiment, GPS receiver 110 may be used for gathering a current location for motor vehicle 102. With this arrangement, navigation system 100 may be configured to automatically determine a beginning point for a particular route as well as for tracking the position of motor vehicle 102 along the route.

Navigation system 100 may include provisions for communicating with a user, including a driver and/or a passenger. In some embodiments, navigation system 100 may include interface 114. In some cases, interface 114 may include provisions for transmitting information to a driver and/or passenger. For example, interface 114 may include a display screen that displays maps including vehicle location and route information. In other cases, interface 114 may include provisions for receiving information from a driver and/or passenger. For example, interface 114 may include one or more input devices that allow a user to input destinations for determining routes, as well as to make selections of various options provided on the display screen. In some cases, the input devices may include one or more buttons, including, but not limited to push-type buttons, disposed adjacent to a display screen. In other cases, the display screen may be a touch-screen display capable of receiving user input. In an exemplary embodiment, interface 114 may include provisions for transmitting and receiving information from a user.

Motor vehicle 102 may include provisions for communicating with, and in some cases controlling, the various components associated with navigation system 100. In some embodiments, navigation system 100 may be associated with a computer or similar device. In the current embodiment, navigation system 100 may include electronic control unit 120, hereby referred to as ECU 120. In one embodiment, ECU 120 may be configured to communicate with, and/or control, various components of navigation system 100. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that may be used, however, it should be kept in mind that not every port or provision must be used or included in a given embodiment. In addition, in various embodiments, additional ports may be associated with ECU 120 to communicate with additional components of a motor vehicle that are not shown.

In some embodiments, ECU 120 may include first port 121 for communicating with GPS receiver 110. In particular, ECU 120 may be configured to receive GPS information from GPS receiver 110. Also, ECU 120 may include second port 122 for communicating with interface 114. In particular, ECU 120 may be configured to transmit information to interface 114, as well as to receive information from interface 114. In some cases, information from interface 114 may include one or more inputs from input devices associated with interface 114.

In some embodiments, a navigation system may be associated with one or more service providers. The term "service provider" as used throughout this detailed description and in the claims refers to any collection of computing resources and/or databases that are disposed outside of a motor vehicle and which are capable of providing resources to the motor vehicle. In an exemplary embodiment, navigation system 100 in motor vehicle 102 may be associated with service provider 150. In some cases, service provider 150 may be a collection of networked computers or computer servers. Service provider 150 may be used to receive, process and/or store information of any kind. In one embodiment, service provider 150 may be configured to collect information related to traffic on roadways, process the information and store the information for later use. In an exemplary embodiment, service provider 150 may provide traffic information to motor vehicle 102. In addition, in some embodiments, service provider 150 may be configured to calculate routes for navigation system 100.

In some embodiments, service provider 150 may include various components configured to communicate with and provide resources to motor vehicle 102. In an exemplary embodiment, service provider 150 may include computer system 152. The term "computer system" refers to the computing resources of a single computer, a portion of the computing resources of a single computer, and/or two or more computers in communication with one another, also any of these resources may be operated by one or more human users. In one embodiment, computer system 152 may include a server.

In some embodiments, a service provider may include various provisions for storing information. In embodiments where a service provider may be used to calculate routes for a navigation system, the service provider may include one or more databases for storing information. In some embodiments, a service provider may include one or more databases for storing navigation information. In addition, in some embodiments, a service provider may include one or more databases for storing traffic information.

In other embodiments, where routes may be calculated onboard a motor vehicle by an electronic control unit or another system, the motor vehicle may include one or more databases that store information. In some embodiments, the motor vehicle may include one or more databases for storing navigation information. In some embodiments, the motor vehicle may receive updated or additional information from one or more service providers to update or supplement databases onboard the motor vehicle. In other embodiments, various information, including, but not limited to navigation information and traffic information, may be stored both at the service provider and onboard the vehicle.

Furthermore, it will be understood that various different databases associated with one or more service providers and/or a motor vehicle could also provide different types of information to any service provider and/or motor vehicle including, but not limited to: traffic information, weather information, carpool lane information, energy consumption information, as well as any other kind of information. For example, in an exemplary embodiment, traffic information may be provided to motor vehicle 102 and/or service provider 150 from a traffic information service provider.

In this embodiment, service provider 150 may be provided with map database 154, which stores navigation information. Service provider 150 may also be provided with traffic database 156. Traffic database 156 may be any kind of database configured to store traffic information. The term "traffic information" as used throughout this detailed description and in the claims refers to any information related to the status of one or more vehicles on a roadway. Traffic information may include the current speeds of one or more vehicles. In some cases, the average speed of vehicles on a roadway may be stored as traffic information. Traffic information may include information associated with one or more traffic incidents involving vehicles on a roadway. In some cases, traffic incidents, including, but not limited to accidents, disabled vehicles, road or lane closures, as well as other events or occurrences affecting the flow of vehicles on a roadway, may be stored and/or distributed as traffic information. In various embodiments, traffic information may refer to either real-time traffic information or historic traffic information.

In an exemplary embodiment, map database 154 and/or traffic database 156 may communicate with computer system 152. Map database 154 and/or traffic database 156 may include any kind of storage device, including but not limited to: magnetic, optical, magneto-optical, and/or memory, including volatile memory and non-volatile memory. In some embodiments, map database 154 and/or traffic database 156 may be integral with computer system 152. In other embodiments, map database 154 and/or traffic database 156 may be separate from computer system 152.

A navigation system may include provisions for communicating with a service provider. In one embodiment, navigation system 100 may communicate with service provider 150 using network 160. Generally, network 160 may be any type of network. In some cases, network 160 may be a vehicle communication network that uses motor vehicles for at least some nodes of the network. In addition, a vehicle communication network may include roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In other embodiments, navigation system 100 may be configured to communicate with service provider 150 using any other type of wireless network, including, but not limited to: WiFi networks, cell phone networks, as well as any other type of network. Furthermore, network 160 may be associated with any type of network standard including, but not limited to: CDMA, TDMA, GSM, AMPS, PCS, analog and/or W-CDMA.

In still other embodiments, navigation system 100 may receive one or more types of information from various service providers using multiple networks. In one embodiment, navigation system 100 may receive map information from service provider 150 using network 160 and may receive traffic information from another service provider over a different network. In some cases, traffic information may be provided from a service provider using the radio data system (RDS). In other cases, traffic information may be provided from a service provider using a cellular network.

In some embodiments, motor vehicle 102 may include provisions for communicating with one or more networks. In some embodiments, ECU 120 in motor vehicle 102 may include third port 123 that is configured to communicate with a network antenna. In an exemplary embodiment, third port 123 may be associated with network antenna 142 that is configured to exchange information with service provider 150 using network 160. In other embodiments, motor vehicle 102 may include additional ports associated with respective antennas for communicating with the one or more networks.

In some embodiments, navigation system 100 may include provisions for communicating with one or more components of a motor vehicle that are not associated directly with navigation system 100. In some embodiments, ECU 120 may include additional ports for communicating directly with one or more additional devices of a motor vehicle, including various sensors or systems of the motor vehicle.

In some embodiments, all or most of the items shown in FIG. 1 are housed in a single case or unit. In other embodiments, the various items shown in FIG. 1 are not housed in a single physical case, but instead, are distributed throughout motor vehicle 100 (see FIG. 1) and communicate with one another via known wired or wireless methods. For example, in a system where one or more items communicate wirelessly, the Bluetooth® protocol may be used.

In various embodiments, a system and method for providing predictive traffic warnings and suggestive rerouting to a motor vehicle is described herein. In various embodiments, certain steps may be associated with an On-Board Unit (referred to as "OBU") of motor vehicle 102 and certain steps may be associated with service provider 150. In some cases, those steps associated with OBU are performed on or by OBU and those steps associated with service provider 150 are performed on or by service provider 150. However, this is not necessarily the case, and those steps associated with OBU may be performed on or by service provider 150 or some other resource, and those steps associated with service provider 150 may be performed on or by OBU or some other resource.

In some embodiments, OBU is a device or provision associated with motor vehicle 102. In some embodiments, OBU includes provisions that permit OBU to receive information. In some embodiments, OBU may store information in a memory or computer readable media. In some embodiments, OBU may include provisions that permit OBU to process information. In some embodiments, OBU may include provisions that permit OBU to display information. In some embodiments, OBU may include provisions that permit OBU to receive information from a user. In some embodiments, OBU may include provisions that permit OBU to receive information from a wireless network. In some embodiments, OBU may include provisions that permit OBU to interact with a user. In some embodiments, OBU may include a combination of two or more of the above provisions.

Different embodiments may include different elements or features. For simplicity, the term, "On-Board Unit" (OBU) is used to refer to those elements or components that are associated with motor vehicle 102 (see FIG. 1) for a particular embodiment. In an exemplary embodiment, OBU comprises one or more facilities of ECU 120. In other embodiments, OBU may also include one or more of the items shown in FIG. 1, for example, ECU 120, interface 114, and/or GPS receiver 110.

Figure 2:
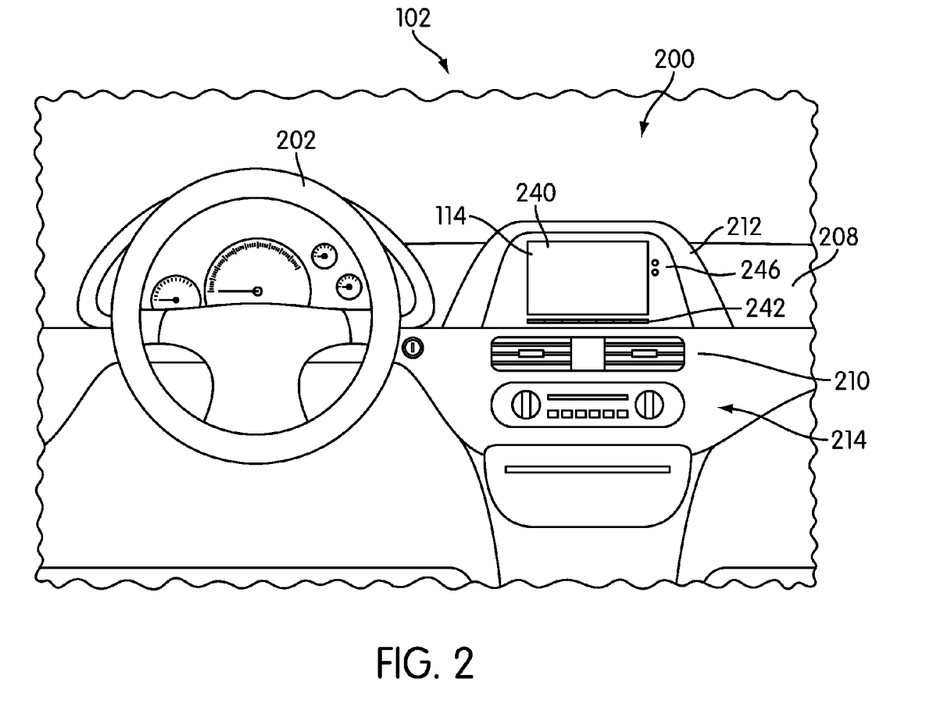
FIG. 2 is view of an exemplary embodiment of an interior portion of a passenger cabin of a motor vehicle.

FIG. 2 is an exemplary embodiment of an interior 200 of a passenger cabin in motor vehicle 102 (see FIG. 1). In an exemplary embodiment, interior 200 may include steering wheel 202, dashboard 208, and center console 210. In some embodiments, center console 210 may include an upper portion 212 and a lower portion 214. In some embodiments, lower portion 214 may include a radio and/or audio controls. In one embodiment, upper portion 212 may include interface 114. In some embodiments, upper portion 212 may include a multi-function unit that is configured to communicate or control an audio system, a climate control system and/or a navigation system.

In one embodiment, ECU 120 or portions of ECU 120 are disposed behind interface 114. In some embodiments, interface 114 may include display screen 240. As described above, in some embodiments, interface 114 may include one or more input devices. In an exemplary embodiment, interface 114 may include buttons 242 and/or switches 246. In some cases, switches 246 may include a rotary knob or dial. In other cases, switches may include a toggle switch or push-button. Furthermore, in another embodiment, display screen 240 may be a touch screen.

Figure 3:
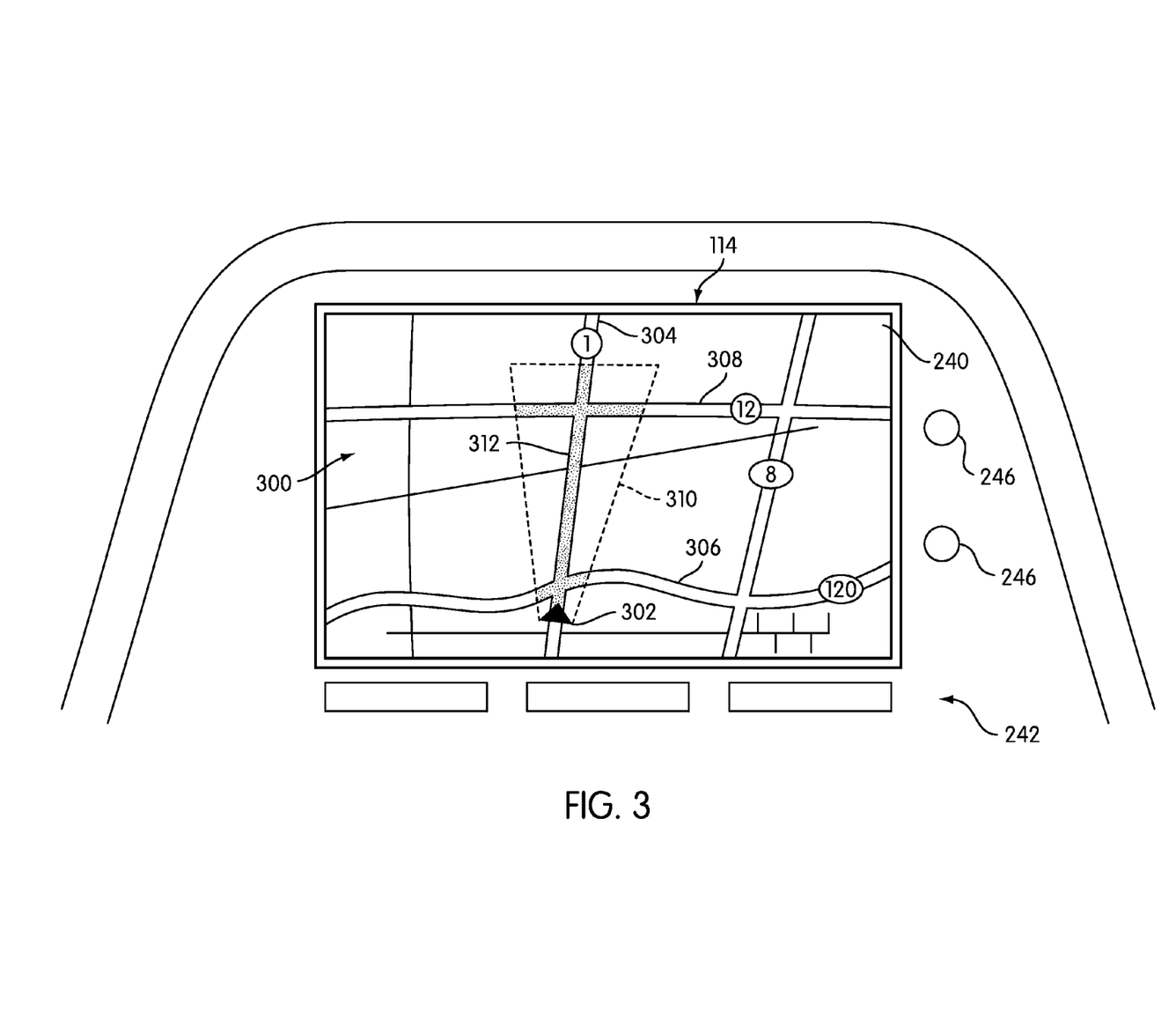
FIG. 3 is a schematic view of an exemplary embodiment of a map portion associated with a navigation system.

FIG. 3 illustrates an exemplary embodiment of various kinds of information that may be displayed by navigation system 100 through interface 114. In the current embodiment, navigation information in the form of various types of roadways and other geographic features are displayed on display screen 240 as map portion 300. In this embodiment, map portion 300 includes indicia 302 associated with the location of motor vehicle 102 within map portion 300. In this embodiment, map portion 300 further includes multiple roadways, including first roadway 304, second roadway 306, and third roadway 308. In an exemplary embodiment, one or more of first roadway 304, second roadway 306, and/or third roadway 308 may be major highways. In other embodiments, one or more of first roadway 304, second roadway 306, and/or third roadway 308 may be minor side streets or surface roads. In addition, map portion 300 may include other roadways, including major highways, as well as minor side streets or surface roads.

For purposes of convenience, a roadway on which motor vehicle is traveling, which roadway may be associated with the current location of motor vehicle 102 as shown by indicia 302 in map portion 300, may be referred to as the primary roadway. Similarly, a roadway which intersects the primary roadway may be referred to as a secondary roadway. In this embodiment, first roadway 304 may be referred to as the primary roadway and at least second roadway 306 and third roadway 308 may be referred to as the secondary roadways.

In some embodiments, motor vehicle information in the form of motor vehicle movement data may be displayed on display screen 240. In some cases, movement data may include one or more of speed, heading, and/or location information, as well as other information associated with the movement of motor vehicle 102. In some embodiments, movement data associated with motor vehicle 102 may be obtained from various sensors, including, but not limited to a vehicle speed sensor, accelerometer, and/or GPS receiver 110, as well as other on-board sensors. In this embodiment, the current location and/or heading of motor vehicle may be displayed on display screen 240 by indicia 302 included in map portion 300.

In some embodiments, navigation system 100 may use motor vehicle information obtained from one or more sensors to determine a future location and/or heading for motor vehicle 102. In an exemplary embodiment, a predicted future location and/or heading of motor vehicle 102 may be displayed on display screen 240 as a predictive travel zone 310 included in map portion 300. In some embodiments, predictive travel zone 310 may be associated with a predetermined shape around the current location of motor vehicle 102. In an exemplary embodiment, predictive travel zone 310 may extend in a direction associated with the heading of motor vehicle 102 along the roadway. In one embodiment, predictive travel zone 310 may be associated with a trapezoidal shape, having a narrower portion located nearer to the current location of motor vehicle 102 and a wider portion located a certain distance ahead of motor vehicle 102.

Referring to FIG. 3, in this embodiment, predictive travel zone 310 is shown in map portion 300. In some embodiments, one or more portions of the various roadways associated with map portion 300 may fall within predictive travel zone 310 as a predictive route 312. In this embodiment, predictive route 312 is shown as a shaded portion of roadways within predictive travel zone 310. Predictive route 312 may represent a possible and/or potential future location of motor vehicle 102. In this embodiment, predictive route 312 includes a portion of first roadway 304 extending ahead of motor vehicle 102, a portion of second roadway 306 extending to the left and right of first roadway 304, and a portion of third roadway 308 also extending to the left and right of first roadway 304 ahead of motor vehicle 102. With this arrangement, predictive route 312 may be configured to represent the possible and/or potential roadways on which motor vehicle 102 may continue to travel. In addition, with this arrangement, navigation system 100 may determine predictive route 312 without requiring an input of a destination or an intended route from the driver. In other embodiments, however, a driver may input a destination and/or intended route information to navigation system 100.

In different embodiments, the shape of predictive travel zone 310 may be varied. In some cases, the shape may be generally associated with a smaller portion nearer to motor vehicle 102 and a larger portion farther from motor vehicle 102. For example, a trapezoidal, conical, or fan shape may be associated with predictive travel zone 310. In other cases, the shape may be generally associated with an approximately similar sized portion near and far from motor vehicle 102. For example, a circular or rectangular shape may be associated with predictive travel zone 310. In still other cases, any regular or irregular shape be configured to provide a desired predictive travel zone. For example, a keyhole, ovoid, or star shape may be associated with predictive travel zone 310.

Furthermore, in some embodiments, the shape and/or size of predictive travel zone 310 may be based on one or more factors. For example, in some embodiments, the shape and/or size of predictive travel zone 310 may be dynamic. In some cases, the shape and/or size of predictive travel zone 310 may vary based on speed and/or heading of motor vehicle 102. In other cases, the shape and/or size of predictive travel zone 310 may vary based on attributes of the roadway on which motor vehicle 102 is traveling, including, but not limited to road shape and geometry, type of roadway, as well as other characteristics. With this arrangement, a larger area may be provided when motor vehicle is traveling at a higher speed or when traveling on a roadway with a higher expected average speed. In other embodiments, the shape and/or size of predictive travel zone 310 may vary based on other factors.

In some embodiments, each roadway may be further divided into various segments or links. The term "roadway segment" as used throughout this detailed description and in the claims refers to any portion of a roadway. In some cases, a roadway segment may extend between two intersections or nodes. For example, in some embodiments, roadways may be stored as a collection of roadway segments that comprise links that are joined together at various intersections. However, in other embodiments, roadway segments may be defined in any other manner.

In various embodiments, map portion 300 may be associated with additional roadway information. In some embodiments, map portion 300 may include traffic information associated with one or more roadways. In the current embodiment, motor vehicle 102 may obtain traffic information associated with one or more of first roadway 304, second roadway 306, third roadway 308, and/or any additional roadways, from a service provider.

It will be understood that FIG. 3 is only intended to schematically illustrate navigation information and/or traffic information in the form of a portion of a map. In some cases, navigation information and/or traffic information may be stored in one or more tables. In other cases, navigation information and/or traffic information may be stored in any other form. In other words, navigation information and/or traffic information may not be visually displayed information but may instead only comprise various collections of data stored in one or more databases.

Figure 4:
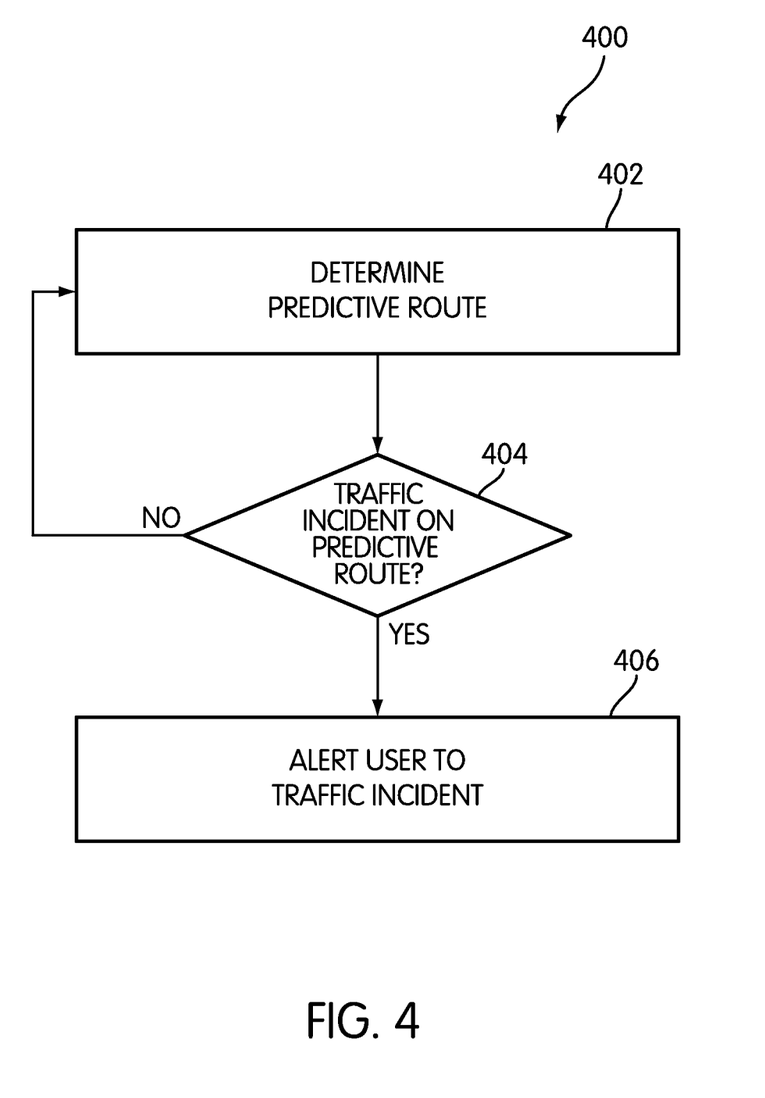
FIG. 4 is an exemplary embodiment of a process for alerting a user to a traffic incident on a route.

FIG. 4 illustrates an exemplary embodiment of a process for alerting a user to a traffic incident on a route. In some embodiments, some of the following steps could be accomplished by OBU on motor vehicle 102. In other embodiments, some of the following steps could be accomplished by service provider 150. In addition, in other embodiments, some of the steps could be performed by other components of motor vehicle 102. For purposes of clarity, navigation system 100 may be used to refer collectively to OBU and/or service provider 150. In other words, steps performed by navigation system 100 may be performed by either OBU or service provider 150 in the following embodiments. It will be understood that in other embodiments one or more of the following steps may be optional.

In some embodiments, navigation system 100 may be used to perform a process 400 for alerting a user to a traffic incident on a predictive route. During step 402, navigation system 100 may determine a predictive route for the motor vehicle, as described above. In some cases, this step may be performed by OBU on motor vehicle 102. For example, in some cases, motor vehicle information obtained from one or more sensors may be used to determine the predictive route of motor vehicle 102. In other cases, a user may input a desired destination into interface 114 to determine the predictive route. In other embodiments, any other type of information associated with the future location and/or heading of motor vehicle 102 may be used to determine the predictive route in step 402.

Next, during step 404, navigation system 100 may determine whether a traffic incident exists on the predictive route. In some embodiments, navigation system 100 may receive traffic information from a service provider. Navigation system 100 may use the received traffic information to determine whether any portion of a roadway or roadway segment associated with the predictive route includes at least one traffic incident. If, at step 404, no traffic incident is determined to be on the predictive route, then the process may return to step 402 and end or repeat. If, however, at step 404 a traffic incident is determined to be on the predictive route, then the process alerts a user to the traffic incident at step 406. During step 406, navigation system 100 may provide a visual and/or audio signal to alert the user to a traffic incident on the predictive route.

In an exemplary embodiment, navigation system 100 may provide an alert to a user about any traffic information affecting the predictive route. For example, in situations where one or more roadways along a predictive route are congested, navigation system 100 may provide an alert to the user that the calculated travel time on the predictive route will be increased accordingly. With this arrangement, a user may be alerted to traffic incidents or other traffic information on the predictive route that will affect the travel of motor vehicle 102.

In different embodiments, navigation system 100 may provide alerts to the user of any roadway information affecting the predictive route. For example, roadway information may include, but is not limited to: traffic information, weather information, carpool lane information, energy consumption information, intersection information, road closure or construction information, as well as any other kind of information that may affect a travel route between two geographic locations.

Figure 5:
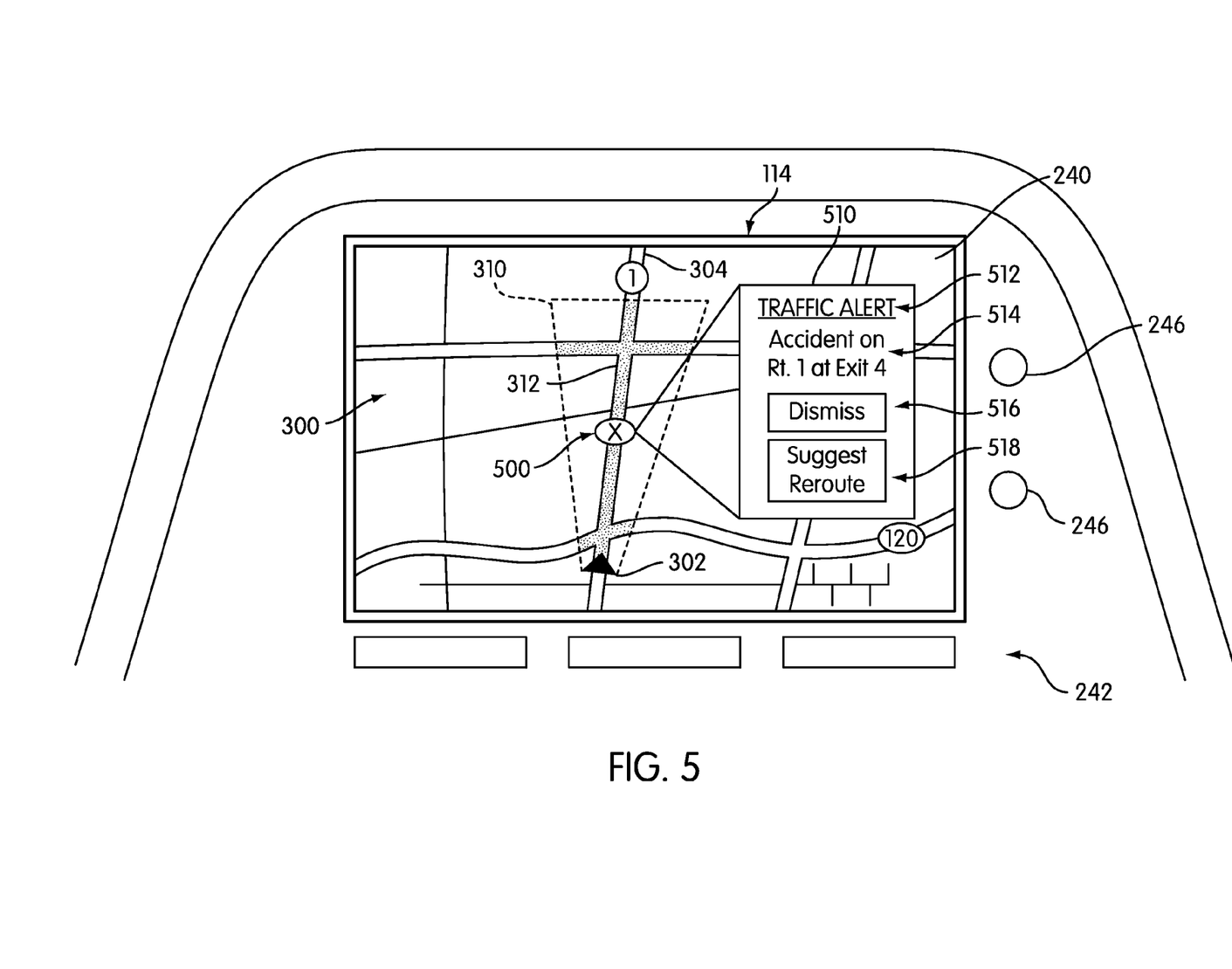
FIG. 5 is a schematic view of an exemplary embodiment of a traffic alert displayed on a map portion associated with a navigation system.
Figure 6:
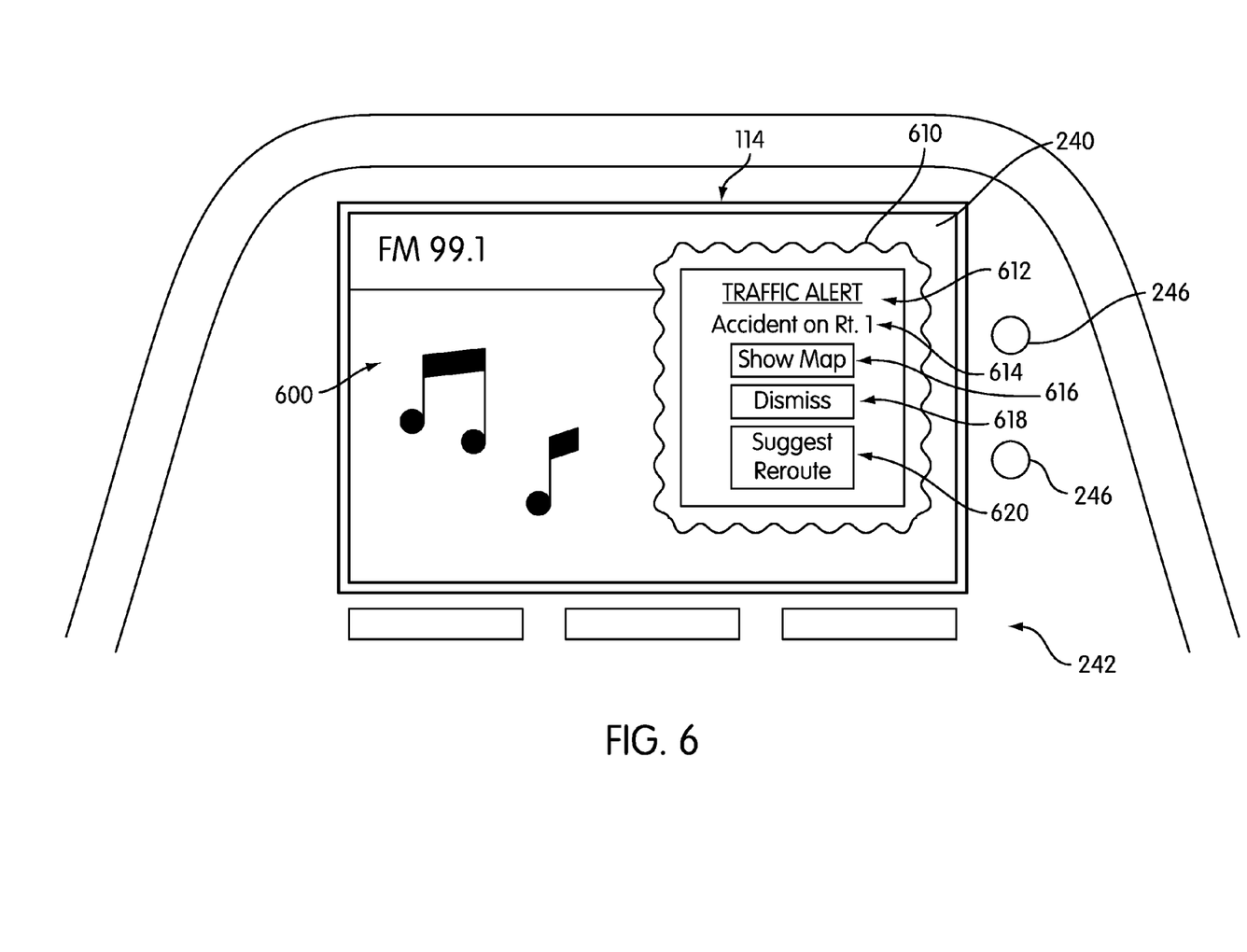
FIG. 6 is schematic view of an exemplary embodiment of a traffic alert displayed on an interface associated with an entertainment system.

FIGS. 5 and 6 illustrate exemplary embodiments of alerts that may be displayed to a user. Referring now to FIG. 5, a traffic alert 510 may be displayed on map portion 300 associated with display screen 240 of interface 114 on motor vehicle 102. In this embodiment, a traffic incident 500 is located on a portion of roadway along predictive route 312 on map portion 300. As shown in FIG. 5, traffic incident 500 may be represented by a graphical icon on map portion 300 of display screen 240. In some embodiments, traffic alert 510 may present incident information to the user, including text and/or graphics. In an exemplary embodiment, traffic alert 510 may be represented by a pop-up box or icon. In some cases, traffic alert 510 may further include text that describes the incident information. In this embodiment, traffic alert 510 includes a header 512 that identifies the type of alert, as well as detailed incident information 514 that may describe the location and/or type of disruption on the travel route.

In some embodiments, traffic alert 510 may present options to the user to take in response to the traffic incident. As shown in FIG. 5, in an exemplary embodiment, traffic alert 510 may include a dismiss option 516 and/or a suggest reroute option 518 to the user. The user may select dismiss option 516 to ignore or take no response to traffic incident 500 that prompted traffic alert 510. Alternatively, the user may select suggest reroute option 518 to request that navigation system 100 calculate an alternative route around traffic incident 500. In some cases, a user may select one of dismiss option 516 and suggest reroute option 518 using an input device, including, buttons 242 and/or switches 246. In other cases, a user may make a selection using a touch screen associated with interface 114.

In some embodiments, a traffic alert may be displayed on an interface associated with another component or system of motor vehicle 102. In an exemplary embodiment, a traffic alert may be configured to be displayed on a multi-function unit that is configured to communicate or control an audio system, a climate control system and/or a navigation system. In one embodiment, a traffic alert may interrupt a display screen associated with another system via a pop up or overlay. Referring now to FIG. 6, a traffic alert 610 may be displayed on entertainment portion 600 associated with display screen 240 of interface 114 on motor vehicle 102.

In some embodiments, traffic alert 610 may present incident information associated with a traffic incident or other traffic information to the user, including text and/or graphics. In an exemplary embodiment, traffic alert 610 may be represented by a pop-up box or icon that appears on top of or overlays entertainment portion 600 associated with display screen 240. In some embodiments, traffic alert 610 may be further configured to attract the user's attention. For example, traffic alert 610 may be fringed by a distinctive color, such as red or yellow, or may include blinking or flashing features. In some cases, traffic alert 610 may further include text that describes the incident information. In this embodiment, traffic alert 610 includes a header 612 that identifies the type of alert, as well as detailed incident information 614 that may describe the location and/or type of disruption on the travel route.

In some embodiments, traffic alert 610 may present options to the user to take in response to the traffic incident. As shown in FIG. 6, in an exemplary embodiment, traffic alert 610 may include a show map option 616. In an exemplary embodiment, the user may select show map option 616 to go to a view of display screen 240 that is associated with map portion 300. In some embodiments, traffic alert 610 may further include a dismiss option 618 and/or a suggest reroute option 620 to the user. As described above with regard to FIG. 5, the user may select dismiss option 618 to ignore or take no response to a traffic incident that prompted traffic alert 610. Alternatively, the user may select suggest reroute option 620 to request that navigation system 100 calculate an alternative route around the traffic incident. In some cases, a user may select one of show map option 616, dismiss option 618, and suggest reroute option 620 using an input device, including, buttons 242 and/or switches 246. In other cases, a user may make a selection using a touch screen associated with interface 114.

Figure 7:
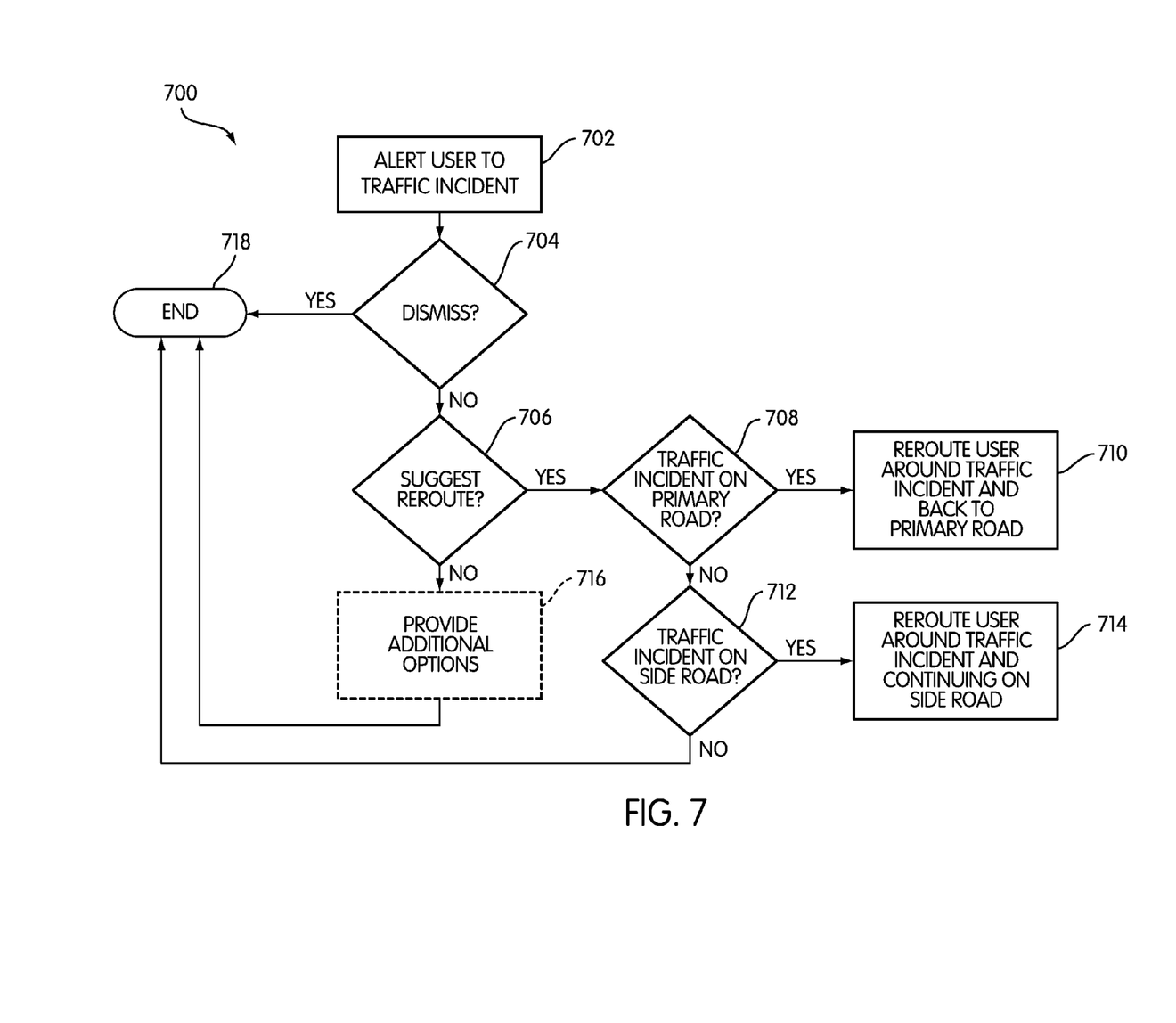
FIG. 7 is an exemplary embodiment of a process of providing a suggestive reroute to a user.
Figure 8:
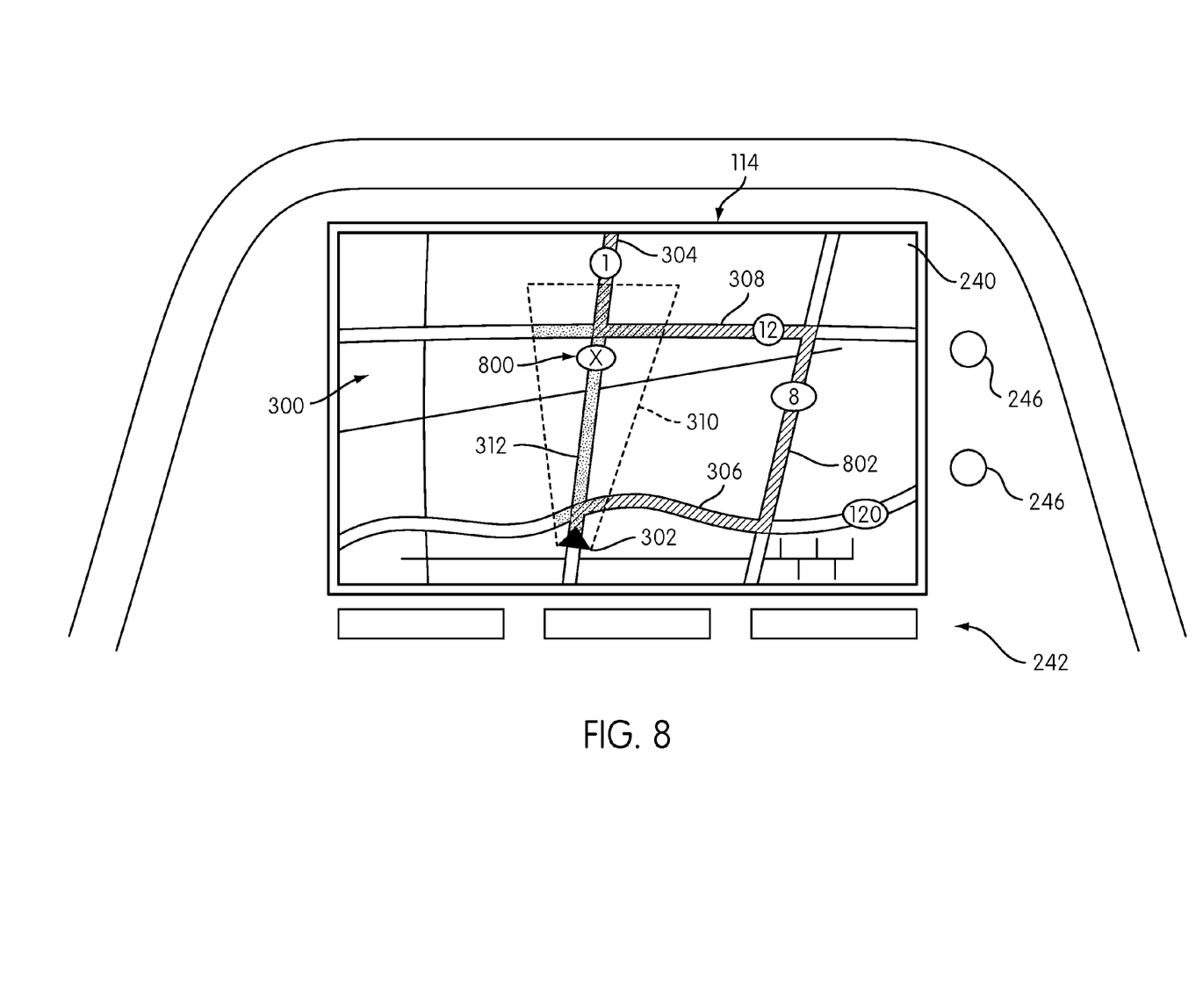
FIG. 8 is a schematic view of an exemplary embodiment of a map portion in which a suggestive reroute is displayed.
Figure 9:
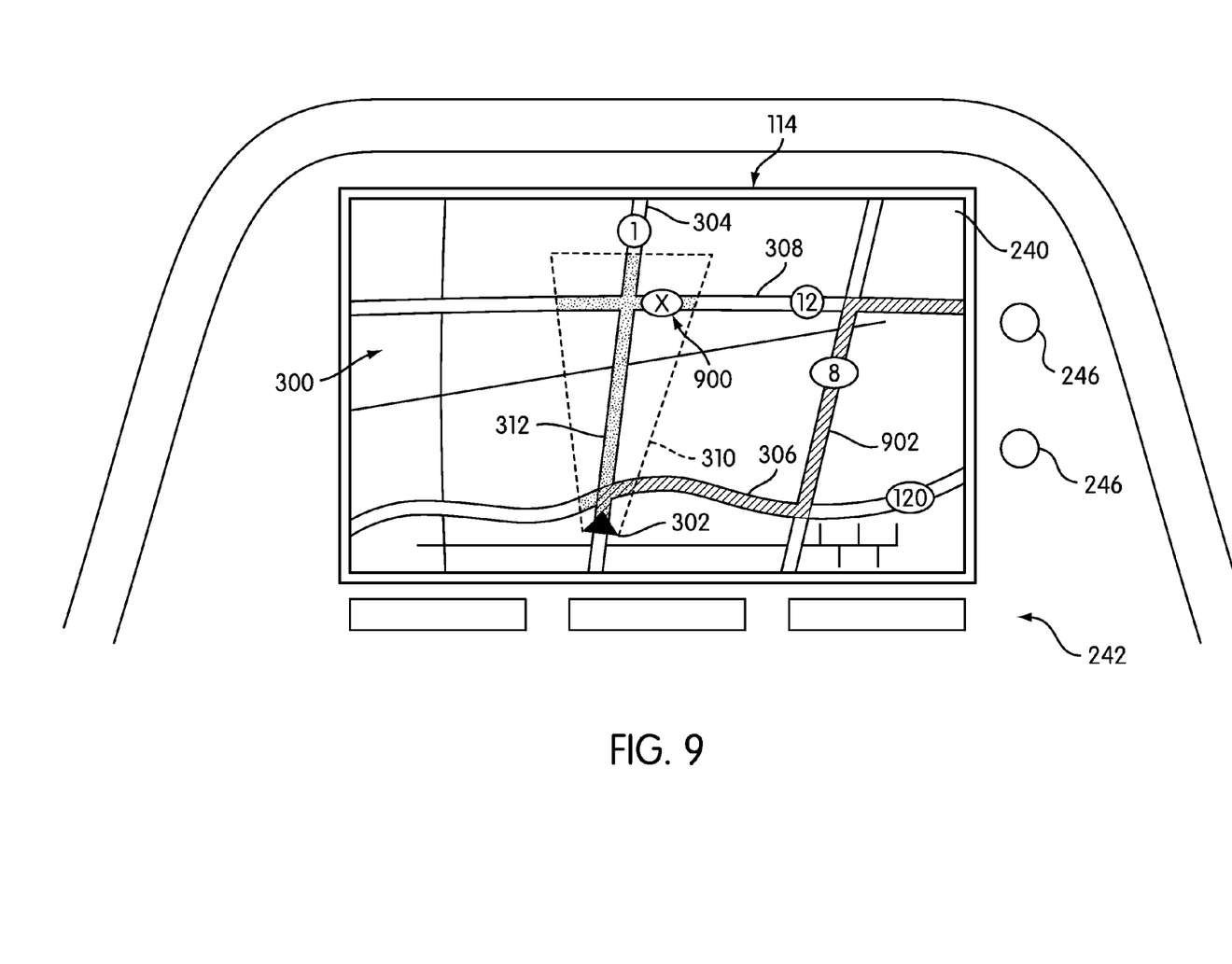
FIG. 9 is a schematic view of an exemplary embodiment of a map portion in which a suggestive reroute is displayed.

In some embodiments, a user may select an option to calculate a suggestive reroute around the traffic incident about which the traffic alert has been provided. FIGS. 7 though 9 illustrate an exemplary embodiment of a process for providing a suggestive reroute to a user. Referring now to FIG. 7, a process 700 may be configured to provide a suggestive reroute to a user of a motor vehicle. It should be understood that the order of the steps described herein is merely exemplary and may be performed in any order. In some embodiments, some of the following steps could be accomplished by OBU on motor vehicle 102. In other embodiments, some of the following steps could be accomplished by a service provider, including service provider 150. In addition, in other embodiments, some of the steps could be performed by other components of motor vehicle 102. For purposes of clarity, navigation system 100 may be used to refer collectively to OBU and/or service provider 150. In other words, steps performed by navigation system 100 may be performed by either OBU or service provider 150 in the following embodiments. It will be understood that in other embodiments one or more of the following steps may be optional.

At step 702, navigation system 100 may alert a user to a traffic incident. In some embodiments, navigation system 100 may alert the user as described above with regard to process 400 and FIG. 4. In other embodiments, any method of alerting a user to a traffic incident may be performed at step 702, including, in some cases, providing an alert from a service provider. Next, at step 704, in some embodiments where a user is presented with options in response to the traffic alert, navigation system 100 determines if a user has selected a dismiss option. If the user has selected the dismiss option at step 704, process 700 ends at step 718. If, however, a user has not select the dismiss option at step 704, then process 700 moves to step 706.

At step 706, navigation system 100 determines if a user has selected a suggest reroute option. If the user has not selected the suggest reroute option at step 706, then process 700 may continue to provide one or more additional options to the user at step 716. Additional options may include, but are not limited to: obtaining more detailed information about the traffic incident, viewing the location of the traffic incident on a map view, as well as other options. Optionally, after providing additional options at step 716, or after providing the suggest reroute option at step 706, process 700 may end at step 718.

Instead, if the user has selected the suggest reroute option at step 706, process 700 continues to calculate a suggestive reroute around the traffic incident about which the traffic alert has been provided at step 702. In some embodiments, process 700 may be configured to adapt the suggestive reroute based on the location of the traffic incident about which the traffic alert has been provided at step 702. In an exemplary embodiment, the suggestive reroute may be different based on whether the traffic incident is on a primary roadway or a secondary roadway within the predictive travel zone. As described above, a roadway on which the motor vehicle is traveling may be referred to as the primary roadway or primary road. Similarly, a roadway which intersects the primary roadway may be referred to as a secondary roadway or side road.

In some embodiments, process 700 may determine whether the traffic incident about which the traffic alert has been provided at step 702 is located on the primary road or a side road within the predictive travel zone. At step 708, navigation system 100 determines whether the traffic incident is located on the primary road within the predictive travel zone. In some embodiments, navigation system 100 may compare the location of the traffic incident and the current location of the motor vehicle using a map database contained in the motor vehicle or at a service provider. In other embodiments, navigation system 100 may use traffic information received from a service provider to compare a current location of the motor vehicle to the location of the traffic incident. Next, if the traffic incident is determined to be on the primary road at step 708, then navigation system 100 may calculate a suggestive reroute that reroutes the user around the traffic incident and back to the primary road at step 710. With this arrangement, the user may avoid the traffic incident and continue traveling on a route that includes the primary roadway.

If, however, at step 708, navigation system 100 determines that traffic incident is not on the primary road, process 700 continues to step 712. At step 712, navigation system 100 determines whether the traffic incident is located on a side road or secondary roadway within the predictive travel zone. Next, if the traffic incident is determined to be on a side road at step 712, then navigation system 100 may calculate a suggestive reroute that reroutes the user around the traffic incident and continuing on the side road at step 714. With this arrangement, the user may avoid the traffic incident and continue traveling on a route that includes the secondary roadway.

In an exemplary embodiment, the selection of the option by the user to suggest a reroute to avoid the traffic incident when the traffic incident is located on a side road within the predictive travel zone indicates to navigation system 100 that the user intends to turn on side road and continue to a destination on a travel route that includes at least the side road. Accordingly, process 700 may provide a suggestive reroute to the user that takes into account an intended future location along the side road in the direction of the location of the traffic incident, without requiring the user to input additional destination or route information.

Alternatively, if navigation system 100 does not determine that the traffic incident is located on a side road at step 712, then process 700 may end at step 718. For example, in the case that the motor vehicle has already passed the traffic incident or the traffic incident is outside the predictive travel zone, as well as if the traffic incident has been cleared or is no longer relevant.

FIGS. 8 and 9 are intended to illustrate exemplary embodiments of a map portion in which a suggestive reroute is displayed. In an exemplary embodiment, a suggestive reroute may be determined according to process 700, described above. Referring to FIG. 8, in this embodiment, a suggestive reroute that reroutes the user around a traffic incident and back to the primary roadway is illustrated. In this embodiment, display screen 240 of interface 114 is displaying map portion 300. Map portion 300 may be substantially similar to map portion 300 described above and may further include indicia 302 of the motor vehicle and first roadway 304, second roadway 306, and third roadway 308. Furthermore, map portion 300 may include predictive travel zone 310 and predictive route 312 within predictive travel zone 310.

In an exemplary embodiment, a traffic incident 800 may be located along predictive route 312. In this embodiment, motor vehicle 102, as indicted by indicia 302, is traveling along first roadway 304 as the primary roadway. Traffic incident 800 may be located on primary roadway, in this case, first roadway 304. In an exemplary embodiment, a user may select an option to suggest a reroute in response to a traffic alert about traffic incident 800, as described above. Using process 700, navigation system 100 may provide a user with a suggestive reroute 802 that reroutes the user around traffic incident 800 and back to the primary roadway, in this case, first roadway 304. With this arrangement, suggestive reroute 802 allows the user to avoid traffic incident 800 and continue traveling on a route that includes the primary roadway, in this case, first roadway 304.

Referring now to FIG. 9, in this embodiment, a suggestive reroute that reroutes the user around a traffic incident and continuing on a secondary roadway is illustrated. In this embodiment, display screen 240 of interface 114 is displaying map portion 300. Map portion 300 may be substantially similar to map portion 300 described above and may further include indicia 302 of the motor vehicle and first roadway 304, second roadway 306, and third roadway 308. Furthermore, map portion 300 may include predictive travel zone 310 and predictive route 312 within predictive travel zone 310.

In an exemplary embodiment, a traffic incident 900 may be located along predictive route 312. In this embodiment, motor vehicle 102, as indicted by indicia 302, is traveling along first roadway 304 as the primary roadway. Traffic incident 900 may be located on a secondary roadway, in this case, third roadway 308, intersecting the primary roadway. In an exemplary embodiment, a user may select an option to suggest a reroute in response to a traffic alert about traffic incident 900, as described above. Using process 700, navigation system 100 may provide a user with a suggestive reroute 902 that reroutes the user around traffic incident 900 and continuing on the secondary roadway, in this case, third roadway 308. With this arrangement, suggestive reroute 902 allows the user to avoid traffic incident 900 and continue traveling on a route that includes the secondary roadway, in this case, third roadway 308.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of providing navigation information for a motor vehicle, comprising the steps of:
   retrieving, in a navigation system in the motor vehicle, navigation information associated with a current location and a heading of the motor vehicle;
   determining, in the navigation system, a predictive travel zone associated with a predetermined shape around the current location of the motor vehicle and extending in a direction associated with the heading of the motor vehicle;
   retrieving, in the navigation system, traffic information corresponding to the predictive travel zone, the traffic information including a traffic incident associated with at least one of a primary roadway and a secondary roadway within the predictive travel zone, the primary roadway being associated with the current location of the motor vehicle and the secondary roadway intersecting the primary roadway and being associated with the heading of the motor vehicle;
   providing, via the navigation system, an alert to a user of the motor vehicle if the traffic incident is located within the predictive travel zone;
   providing an option to the user to reroute the motor vehicle around the traffic incident;
   receiving, in the navigation system, a selection from the user to reroute the motor vehicle around the traffic incident; and
   upon receiving the selection from the user to reroute the motor vehicle, the navigation system calculating a new route around the traffic incident to a predictive future location on the secondary roadway beyond the traffic incident, if the traffic incident is associated with the secondary roadway; and wherein the navigation system determines that the user intends to travel towards the predictive future location on the secondary roadway based on the selection from the user to reroute the motor vehicle.

2. The method according to claim 1, wherein the predetermined shape of the predictive travel zone is based on a type of road associated with at least the primary roadway and the secondary roadway.

3. The method according to claim 1, wherein the predetermined shape of the predictive travel zone is based on a shape of the primary roadway.

4. The method according to claim 1, wherein the predetermined shape of the predictive travel zone varies based on a speed of the motor vehicle.

5. The method according to claim 1, wherein the predetermined shape of the predictive travel zone varies based on an average speed associated with at least the primary roadway and the secondary roadway.

6. The method according to claim 1, wherein the alert further comprises a show map option, a dismiss option and a suggest reroute option.

7. A method of providing a suggestive reroute around a traffic incident for a motor vehicle, comprising the steps of:
calculating, in a navigation system in the motor vehicle, a predictive travel zone associated with a predetermined shape around a current location of the motor vehicle and extending in a direction associated with a heading of the motor vehicle;
retrieving, from the navigation system, navigation information corresponding to one or more roadways included in the predictive travel zone;
determining, in the navigation system, a predictive route using the retrieved navigation information, the predictive route being associated with a potential future location of the motor vehicle;
identifying, in the navigation system, a primary roadway along the predictive route, the primary roadway being associated with the current location of the motor vehicle and on which the motor vehicle is traveling;
identifying, in the navigation system, at least one secondary roadway along the predictive route, the at least one secondary roadway intersecting the primary roadway and being associated with the heading of the motor vehicle;
retrieving traffic information corresponding to the predictive travel zone from the navigation system, the traffic information including one or more traffic incidents associated with one or more of the primary roadway and the at least one secondary roadway;
providing, via the navigation system, an alert to a user of the motor vehicle if a traffic incident is located within the predictive travel zone;
receiving, from the navigation system, a request from the user to reroute the motor vehicle around the traffic incident;
upon receiving the request from the user to reroute the motor vehicle:
calculating, in the navigation system, a reroute around the traffic incident and back on the primary roadway, if the traffic incident is associated with the primary roadway; or
determining, by the navigation system, that the user intends to travel towards a predictive future location on the secondary roadway based on receiving the request from the user to reroute the motor vehicle;
calculating, in the navigation system, a suggestive reroute around the traffic incident that takes into account the predicted future location on the secondary roadway beyond the traffic incident if the traffic incident is associated with the secondary roadway; and
providing the suggestive reroute to the user.

8. The method according to claim 7, wherein the step of providing an alert to a user includes providing at least one of an audio and a visual indication.

9. The method according to claim 7, wherein the alert may be provided within an entertainment portion of an interface associated with the motor vehicle.

10. The method according to claim 7, wherein the alert may further include a show map option, a dismiss option and a suggest reroute option.

11. The method according to claim 10, wherein the step of receiving a request from the user further includes receiving a selection of the suggest reroute option from an interface associated with the motor vehicle.

12. The method according to claim 11, wherein the interface includes a touch screen.

13. The method according to claim 10, wherein the alert further includes an option to view a map portion of an interface associated with the motor vehicle.

14. A method of providing a suggestive reroute around a traffic incident for a motor vehicle, comprising the steps of:
receiving, in a navigation system in the motor vehicle, motor vehicle information from at least one sensor associated with the motor vehicle, the motor vehicle information including at least a current location and a heading of the motor vehicle;
determining, in the navigation system, a predictive travel zone associated with a predetermined shape around the current location of the motor vehicle and extending in a direction associated with the heading of the motor vehicle;
retrieving, in the navigation system, navigation information corresponding to one or more roadways included in the predictive travel zone;
retrieving, in the navigation system, traffic information corresponding to the predictive travel zone, the traffic information including one or more traffic incidents associated with at least one of a primary roadway and a secondary roadway within the predictive travel zone, the primary roadway being associated with the current location of the motor vehicle and the secondary roadway intersecting the primary roadway and being associated with the heading of the motor vehicle;
providing, via the navigation system, an alert to a user of the motor vehicle if a traffic incident is located within the predictive travel zone;
receiving, at the navigation system, a request from the user to reroute the motor vehicle around the traffic incident;
upon receiving the request from the user to reroute the motor vehicle, the navigation system determining if the traffic incident is associated with the primary roadway or the secondary roadway; and
if the traffic incident is associated with the secondary roadway, calculating a suggestive reroute around the traffic incident to the secondary roadway that takes into account a predicted future location on the secondary roadway, and providing the suggestive reroute to the user;
wherein the navigation system determines that the user intends to travel towards the predictive future location on the secondary roadway beyond the traffic incident based on receiving the request from the user to reroute the motor vehicle.

15. The method according to claim 14, wherein the navigation information is received at the motor vehicle from a service provider.

16. The method according to claim 14, further including calculating a reroute around the traffic incident and continuing back on the primary roadway, if the traffic incident is associated with the primary roadway.

17. The method according to claim 14, wherein the alert further comprises a show map option, a dismiss option and a suggest reroute option.

18. The method according to claim 14, wherein the traffic information is received at the motor vehicle from a traffic database.

19. The method according to claim 14, wherein the traffic information is real time traffic information.

20. The method according to claim 14, wherein the traffic information is received at the motor vehicle from a traffic service provider.

\* \* \* \* \*